June 20, 1933.  C. A. BORNMANN  1,914,398

INTERMITTENT MOVEMENT

Filed Jan. 4, 1932

INVENTOR.
CARL A. BORNMANN.
BY
ATTORNEY.

Patented June 20, 1933

1,914,398

UNITED STATES PATENT OFFICE

CARL A. BORNMANN, OF BINGHAMTON, NEW YORK, ASSIGNOR TO AGFA ANSCO CORPORATION, OF BINGHAMTON, NEW YORK, A CORPORATION OF NEW YORK

INTERMITTENT MOVEMENT

Application filed January 4, 1932. Serial No. 584,727.

My invention relates to improvements in an intermittent movement for motion picture apparatus and has for its primary object the provision of an intermittently moving film shuttle with novel driving means therefor, comprising few parts, simple in construction, silent in operation, and easily assembled.

A further object of my invention lies in the provision of a driving means for the shuttle comprising two cams, one operated direct from the driving shaft and the other by means of a sleeve surrounding such shaft.

A further object of my invention lies in the provision of a driving means by means of which the driving shaft serves to rotate one of the cams and the film sprocket shaft and the latter in turn forms the driving means for the other cam.

Other objects and advantages in details of construction will be apparent as the description proceeds, reference now being had to the figures of the accompanying drawing, forming a part of this application and wherein like reference numerals indicate like parts.

Figure 1:
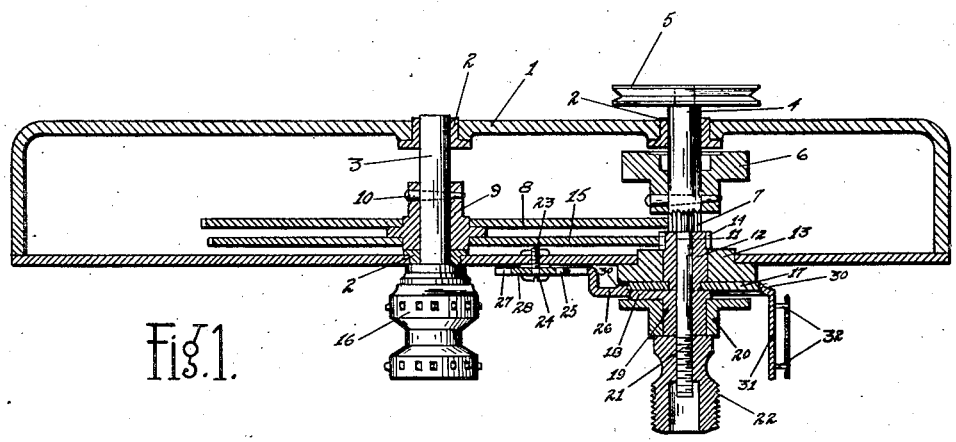
Figure 1 is a top sectional view of my invention in assembled position.

The reference character 1 refers to a supporting casing provided with suitable bearings 2 for the sprocket shaft 3 and one end of the drive shaft 4. The drive shaft 4 is provided on one projecting end with a pulley 5 or other suitable power receiving means whereby the drive shaft 4 may be rotated.

Mounted upon the drive shaft 4 within the casing 1 is a balance or fly wheel 6 whereby smooth even rotation of the shaft is assured.

Within the casing 1, the shaft 4 is provided with gear teeth 7 cut therein and meshing with the teeth 7 is a gear 8 rotatable with the sprocket shaft 3 by means of the bushing 9 pinned to such sprocket shaft as at 10.

The drive shaft 4 is reduced in diameter immediately adjacent the teeth 7 thereof, as at 11, and surrounding and freely rotatable on the reduced portion 11 is a sleeve 12 journaled in a bushing 13 in the adjacent side of the casing 1. The sleeve 12 within the casing, is provided with teeth 14 thereon and meshing with these teeth 14 is a gear 15 also rigidly secured to the bushing 9 and therefore rotatable with the sprocket shaft 3. The sprocket shaft 3 is provided on its outer projecting end with the film sprocket 16.

Rigidly secured to and for rotation with the sleeve 12, is a cam 17 for a purpose to be described. Directly adjacent the cam 17 and mounted upon the reduced portion 11 of the shaft 4 for rotation therewith is a second cam 18 for a purpose to be described. This cam 18 is provided with a hub portion 19 by means of which it is secured to the shaft and surrounding this hub portion is a flanged collar 20 overlying the cams and serving to maintain them in proper position longitudinally on the shaft. The outer end of the reduced portion 11 of the drive shaft 4 is threaded as at 21 to receive a knurled nut 22 whereby to retain the parts in assembled position.

Suitably secured to one side of the casing 1 is a guide pin 23 provided on its outer end with a head 24 and guided by this pin 23 is one end 25 of a film shuttle 26 bifurcated as at 27 for engagement on either side of the pin 23. There may be provided on the pin 23 a shoe 28 with which the bifurcated end 25 of the shuttle has a sliding engagement. This has a tendency to reduce rattle and noise during operation of the shuttle in its sliding movement, the shoe 28 being, of course, freely pivoted on the pin 23 to permit rocking movement of the shuttle.

Figure 2:
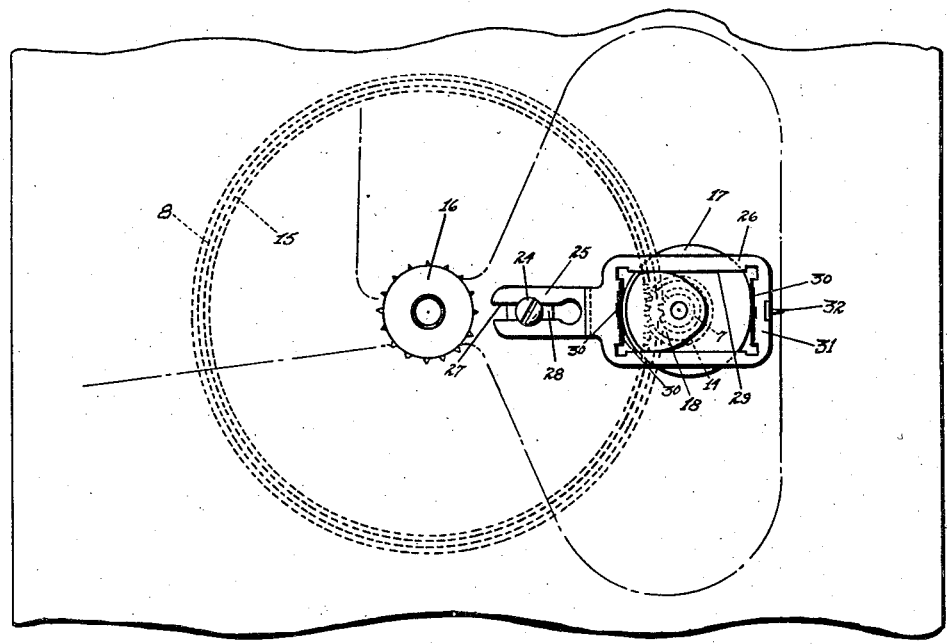
Figure 2 is a side view thereof.

The film shuttle 26 is provided with a rectangular opening 29, the upper and lower edges of which are adapted to be engaged by the cam 18 whereby upon rotation of the cam the shuttle may be rocked about the pivot point 23. The ends of the shuttle defining the opening 29, are turned inwardly slightly as at 30 and such inwardly turned portions are engaged by the cam 17 whereby upon rotation of the cam, the shuttle may be moved longitudinally, that is, to the left and right in Figures 1 and 2, sliding on the shoe 28.

The shuttle 26 at its end opposite the end 25 is bent angularly as at 31 and provided with film engaging claws 32.

From the foregoing construction it will be apparent that in operation the shaft 4 upon being driven from the source of power provided, the cam 17 will be driven therewith directly for moving the shuttle 26 into and out of film engaging position. Simultaneously, the sprocket shaft 3 will be driven through the means of the teeth 7 on the drive shaft 4 and the gear 8. This results in driving the sprocket 16 whereby the film may be fed to and from the shuttle in the usual manner. Likewise, the cam 18 will be simultaneously driven through the means of the gear 15, teeth 14, and sleeve 12, whereby the shuttle 26 will be rocked about the pivot point 23 to raise and lower the shuttle whereby the film may be intermittently moved downwardly.

It will be obvious, of course, that the cams 17 and 18 are so arranged that the desired cycle of movement of the shuttle takes place, namely, the film claws will be out of film engaging position on the upward movement of the shuttle and in film engaging position on the downward movement of the shuttle. It will be obvious also that by changing the gear ratio in the driving means for these cams, the relation of film engaging movements of the shuttle to the non-film engaging movements thereof, may be varied.

In operation the cams are always in engagement with the shuttle and the simplicity and absence of complicated and multiple parts, lends to this intermittent mechanism the special feature of quiet running and smoothness of operation.

Of course, changes may be made in details of construction and arrangement of parts without departing from the spirit and scope of my invention. I do not limit myself, therefore, to the exact form herein shown and described, other than by the appended claims.

I claim:

1. In combination, a drive shaft, a cam fixed on said shaft, a sleeve rotatable on said shaft, a cam fixed on said sleeve, a film sprocket shaft, two gears fixed on said sprocket shaft, one of said gears being driven by said drive shaft and the other gear driving said sleeve, and a film engaging shuttle operatively engaging said cams.

2. In combination, a drive shaft and a sprocket shaft parallel therewith, a pair of gears on said sprocket shaft for rotation therewith, gear teeth cut on said drive shaft and meshing with one of said gears, a sleeve rotatably mounted on said drive shaft and having gear teeth cut thereon and meshing with the other of said gears, a cam on said drive shaft and a cam on said sleeve, and a film shuttle operatively engaging said cams.

In testimony whereof, I affix my signature.

CARL A. BORNMANN.